US011293813B1

(12) United States Patent
Gayer et al.

(10) Patent No.: US 11,293,813 B1
(45) Date of Patent: Apr. 5, 2022

(54) TEMPERATURE MONITORING AND LABELING SYSTEM

(71) Applicant: E Smart Labels LLC, Bowling Green, OH (US)

(72) Inventors: Jeffrey C. Gayer, Sylvania, OH (US); Jeffery S. Palmer, Bowling Green, OH (US); Christopher Harold King, Fayetteville, GA (US)

(73) Assignee: E Smart Labels LLC, Bowling Green, OH (US)

( * ) Notice: Subject to any disclaimer, the term of this patent is extended or adjusted under 35 U.S.C. 154(b) by 228 days.

(21) Appl. No.: 16/023,242

(22) Filed: Jun. 29, 2018

Related U.S. Application Data

(60) Provisional application No. 62/528,743, filed on Jul. 5, 2017.

(51) Int. Cl.
*G01K 11/00* (2006.01)
*G01K 13/00* (2021.01)
*G01K 1/024* (2021.01)
*G01K 11/12* (2021.01)

(52) U.S. Cl.
CPC ............ *G01K 13/00* (2013.01); *G01K 1/024* (2013.01); *G01K 11/12* (2013.01)

(58) Field of Classification Search
CPC combination set(s) only.
See application file for complete search history.

(56) References Cited

U.S. PATENT DOCUMENTS

| | | | |
|---|---|---|---|
| 5,711,160 A | 1/1998 | Namisniak et al. | |
| 5,802,015 A | 9/1998 | Rothschild et al. | |
| 6,337,836 B1 | 1/2002 | Eidelson | |
| 6,427,138 B1 | 7/2002 | Witt | |
| 6,549,135 B2 | 4/2003 | Singh et al. | |
| 6,557,760 B2 | 5/2003 | Goodwin, III | |
| 6,753,830 B2 | 6/2004 | Gelbman | |
| D517,122 S | 3/2006 | Milliorn | |
| 7,026,929 B1* | 4/2006 | Wallace | G08B 25/003 340/539.13 |
| 7,050,991 B2 | 5/2006 | Ogasawara | |
| 7,152,040 B1 | 12/2006 | Hawthorne et al. | |
| 7,464,873 B2 | 12/2008 | Spencer et al. | |
| 7,520,429 B2 | 4/2009 | Koster | |

(Continued)

FOREIGN PATENT DOCUMENTS

| | | |
|---|---|---|
| CN | 203106881 U | 8/2013 |
| JP | 2007-316690 A | 12/2007 |
| WO | 2015167953 A1 | 11/2015 |

OTHER PUBLICATIONS

Jun Kawahara, et al., "Reconfigurable Sticker Label Electronics Manufactured from Nanofibrillated Cellulose-Based Self-Adhesive Organic Electronic Materials," Nov. 2013, pp. 1-23, vol. 14, Issue 11, Organic Electronics, Elsevier Limited, Oxford, UK.

(Continued)

*Primary Examiner* — Lisa M Caputo
*Assistant Examiner* — Nasir U. Ahmed
(74) *Attorney, Agent, or Firm* — MacMillan, Sobanski & Todd, LLC

(57) ABSTRACT

A temperature monitoring and labeling system that includes, among other things, a computer and a thermometer having an electronic label display in communication with the computer.

18 Claims, 24 Drawing Sheets

(56) References Cited

U.S. PATENT DOCUMENTS

| | | | |
|---|---|---|---|
| 7,520,668 B2 * | 4/2009 | Chen | G01J 5/02 374/121 |
| 7,561,982 B2 | 7/2009 | Rund et al. | |
| 7,722,248 B1 * | 5/2010 | Chapman | G01K 1/024 374/155 |
| 7,728,811 B2 | 6/2010 | Albert et al. | |
| 7,840,439 B2 | 11/2010 | Junger | |
| 8,101,892 B2 | 1/2012 | Kates | |
| 8,230,005 B2 | 1/2012 | McKay et al. | |
| 9,477,962 B2 | 10/2016 | Worrall et al. | |
| 9,818,148 B2 * | 11/2017 | Bynum | G06Q 30/0639 |
| 2001/0020935 A1 | 9/2001 | Gelbman | |
| 2002/0065789 A1 | 5/2002 | Witt | |
| 2003/0144985 A1 | 7/2003 | Ebert | |
| 2004/0100380 A1 | 5/2004 | Lindsay et al. | |
| 2005/0131578 A1 | 6/2005 | Weaver | |
| 2005/0248455 A1 | 11/2005 | Pope et al. | |
| 2006/0163349 A1 | 7/2006 | Neugebauer | |
| 2006/0169787 A1 | 8/2006 | Gelbman | |
| 2007/0024551 A1 | 2/2007 | Gelbman | |
| 2007/0089433 A1 | 4/2007 | McDonnell et al. | |
| 2008/0018466 A1 | 1/2008 | Batra et al. | |
| 2008/0120188 A1 | 5/2008 | Mobley et al. | |
| 2008/0186175 A1 | 8/2008 | Stern | |
| 2008/0259995 A1 * | 10/2008 | Kuhn | G01K 7/32 374/152 |
| 2009/0045918 A1 | 2/2009 | Droesler et al. | |
| 2009/0188396 A1 | 7/2009 | Hofmann et al. | |
| 2011/0004502 A1 | 1/2011 | Dillard et al. | |
| 2011/0102155 A1 | 5/2011 | Choi et al. | |
| 2012/0274470 A1 | 11/2012 | Sandvick | |
| 2012/0303492 A1 | 11/2012 | Connors et al. | |
| 2013/0138656 A1 | 5/2013 | Wheaton | |
| 2013/0226742 A1 | 8/2013 | Johnson | |
| 2013/0227971 A1 | 9/2013 | Tamborra | |
| 2014/0086274 A1 * | 3/2014 | Henke | G01K 1/026 374/142 |
| 2014/0204401 A1 | 6/2014 | Salerno | |
| 2014/0200481 A1 * | 7/2014 | Johnson | A61B 10/007 600/561 |
| 2014/0210692 A1 | 7/2014 | Waters et al. | |
| 2015/0310385 A1 | 10/2015 | King et al. | |
| 2016/0012337 A1 * | 1/2016 | Kaye | G06N 20/00 706/12 |
| 2016/0101320 A1 * | 4/2016 | Tsutsui | A63B 21/0722 482/8 |
| 2016/0260163 A1 * | 9/2016 | Sjodin | G06Q 30/0641 |
| 2016/0322832 A1 * | 11/2016 | Winand | H01M 8/0488 |
| 2016/0377490 A1 | 12/2016 | Nivala et al. | |
| 2017/0124633 A1 | 5/2017 | Natarajan et al. | |
| 2017/0229000 A1 | 8/2017 | Law | |

OTHER PUBLICATIONS

Rosetta Newsome, et al. "Applications and Perceptions of Date Labeling of Food," Comprehensive Reviews in Food Science and Food Safety, Jul. 2014, pp. 745-769, vol. 13, Issue 4, Institute of Food Technologists, Chicago, IL, US.
http://www.weberscientific.com/time-and-temperature-tracking-thermometer-deltatrak-26003, at least as early as Apr. 24, 2017.

* cited by examiner

TEMPERATURE MONITORING AND LABELING SYSTEM

RELATED APPLICATIONS

This application claims priority to U.S. Provisional Application No. 62/528,743, filed under 35 U.S.C. § 111(b) on Jul. 5, 2017, the entire disclosure of which is expressly incorporated herein by reference for all purposes.

TECHNICAL FIELD

The invention relates generally to electronic systems. More specifically, the invention is directed to a temperature monitoring and labeling system.

BACKGROUND OF THE INVENTION

Current methods of managing expiration-dated products, such as just-in-time manufactured (e.g., fresh prepared foods in restaurants) and perishable packaged manufactured ingredients/products, require the user/consumer to apply preprinted or blank single-use adhesive materials such as adhesive labels to storage containers to facilitate notice of the date of expiration. In many situations, the safety of the just-in-time manufactured or opened perishable packaged ingredient and product is defined by law wherein the product cannot be portioned and then sold to consumers past a certain defined time period (e.g., seven days after preparation of a ready-to-eat food in retail food service establishments in the United States or after a "use by" date has occurred after a consumer/user has opened a packaged ingredient or product as defined by the ingredient/product manufacturer, including food, chemicals, cosmetics, pharmaceuticals, laboratory reagents, vaccines, and other products).

Typically, date marking adhesive labels are passive devices that must be replaced each time the storage container is reused such as when a restaurant reusable food container is washed, rinsed, and sanitized after the food in it is used or discarded. Likewise, preprinted labels with expiration date information do not actively alert users to when the product will expire or has expired upon opening, which is normally based on manufacturer recommendations and/or governmental regulatory requirements. The information recorded on these adhesive labels often times becomes illegible due to the storage conditions that affect the inks, which can result in the information not being used properly or not used effectively. Further, remaining adhesives from the labels often become a source for contamination when left on reusable food containers. These situations can increase food safety risk to the consumer. More importantly, the safety, quality, and thus value, of all perishable just-in-time manufactured products and newly opened perishable packaged ingredients and products can be compromised when used beyond the expiration date. This is because there is no efficient means to track and give notice to users which just-in-time manufactured products and opened perishable packages of ingredients and products should be used first before their expiration date occurs, nor is there a current means to provide users/consumers with a caution as to when a perishable product no longer retains its safety/quality or value.

It has also been found that it is difficult to monitor and record the temperature of expiration-dated products such as food during, for example, the preparation, storage, transportation, and serving of such products. In such situations, it is often difficult to regularly monitor and record temperatures of the food.

As it will be appreciated, there is a need for an electronic system for monitoring and recording temperatures of expiration-dated products and labeling such products with relevant information for legal, safety, value, and inventory purposes.

BRIEF SUMMARY OF THE INVENTION

In summary, the invention is a temperature monitoring and labeling system. In an embodiment, the system may include a computer and a thermometer having an electronic label display in communication with the computer.

BRIEF DESCRIPTION OF THE DRAWINGS

FIG. 19A shows the front side of the base of the charging station. FIG. 19B shows the back side of the base of the charging station. FIG. 19C shows the bottom surface of the base of the charging station, with feet for enhanced gripping on surfaces.

DETAILED DESCRIPTION OF THE INVENTION

Figure 1:
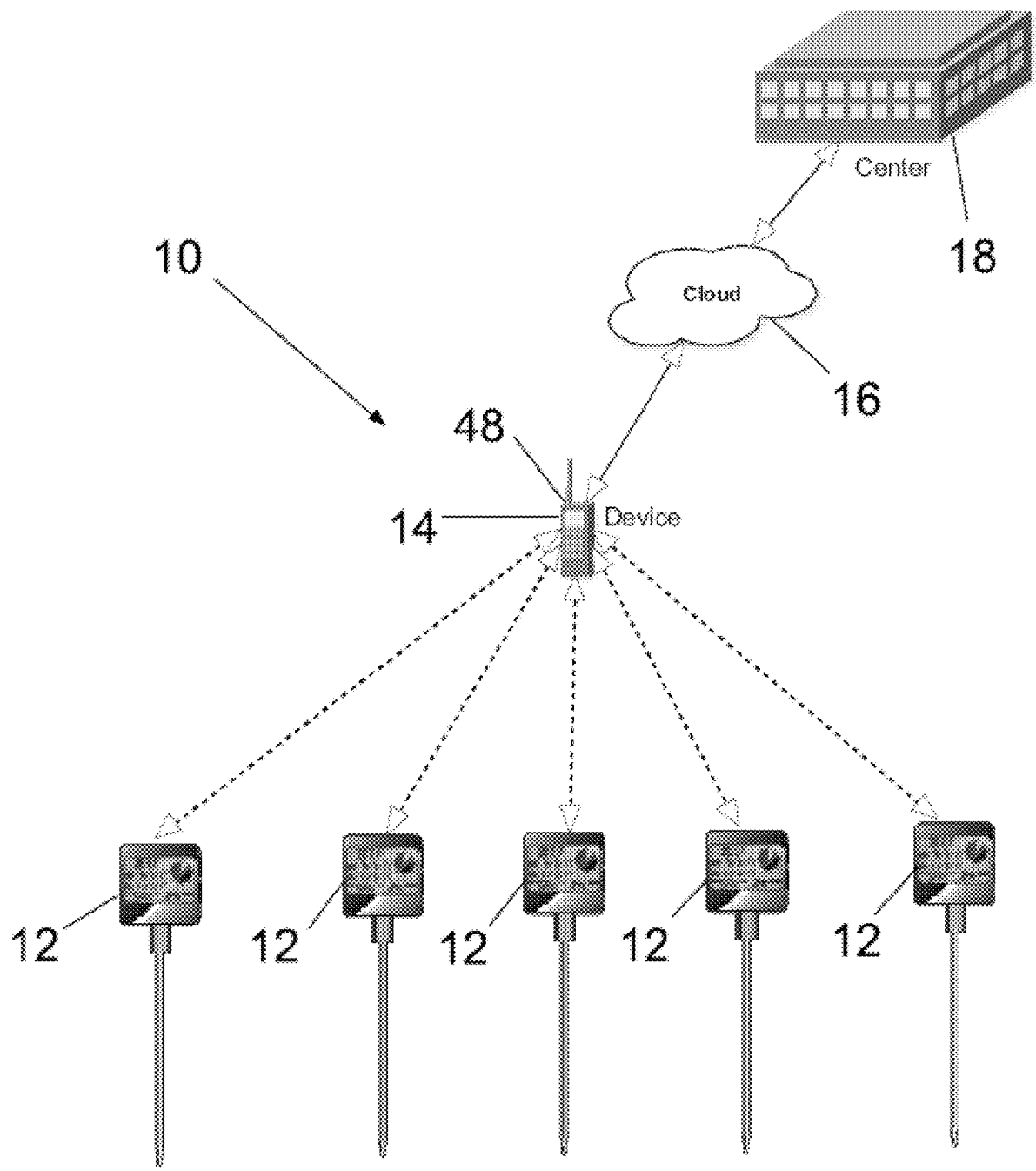
FIG. 1 is a schematic view of an embodiment of the temperature monitoring and labeling system according to the invention.

The following detailed description is of the best currently contemplated modes of carrying out exemplary embodiments of the invention. The description is not to be taken in a limiting sense, but is made merely for the purpose of illustrating the general principles of the invention.

Broadly, an embodiment of the invention provides a temperature monitoring and labeling system. The system may include at least one thermometer with an electronic label display that is in bidirectional communication with a computer having a user interface, such as a smart device. The computer may have a program product including a machine-readable program code, such as an application, for causing, when executed, the computer to perform steps. The thermometer may be configured to receive a plurality of mutable data sets. Further, the thermometer may be configured to transmit a plurality of mutable data sets to the computer. The computer may be configured to transmit and receive a plurality of mutable data sets through a network to and from a center.

The invention will now be described in detail with reference being made to the drawings. In the drawings an embodiment of the temperature monitoring and labeling system of the invention will be indicated generally by the reference number "10." Referring to FIG. 1, the system 10 may include one or more thermometers 12 that are in bidirectional communication with a computer such as a smart device 14 that is in bidirectional communication through a network such as a cloud network 16 with a communications center 18.

Referring to FIGS. 1-8, the thermometer 12 may include a housing 20 having a front 22, a back 24, a top 26, a bottom 28, a first side 30 and a second side 32. In an embodiment, the housing 20 is made of plastic. In another embodiment, the housing 20 is made of rubber. The front 22 may include an electronic label display 34. In an embodiment, the display 34 is a light-emitting diode (LED) display. The top 26 may include a port 36 for charging a rechargeable battery positioned within the housing 20. Or, alternatively, the port 36 may be located on the first side 30 or second side 32, as illustrated in FIG. 5B. In an embodiment, the port 36 is a Universal Serial Bus (USB) port. The first side 30 may include an on/off button 38 for powering the thermometer 12 on and off. The first side 30 may include a connection control button 40 for causing the thermometer 12 to connect with the smart device 14. In an embodiment, the connection control button 40 is a Bluetooth brand control button that is in communication with a Bluetooth brand device positioned within the housing 20 to allow for bidirectional communication between the thermometer 12 and a Bluetooth brand device positioned in the smart device 14.

Figure 5A:
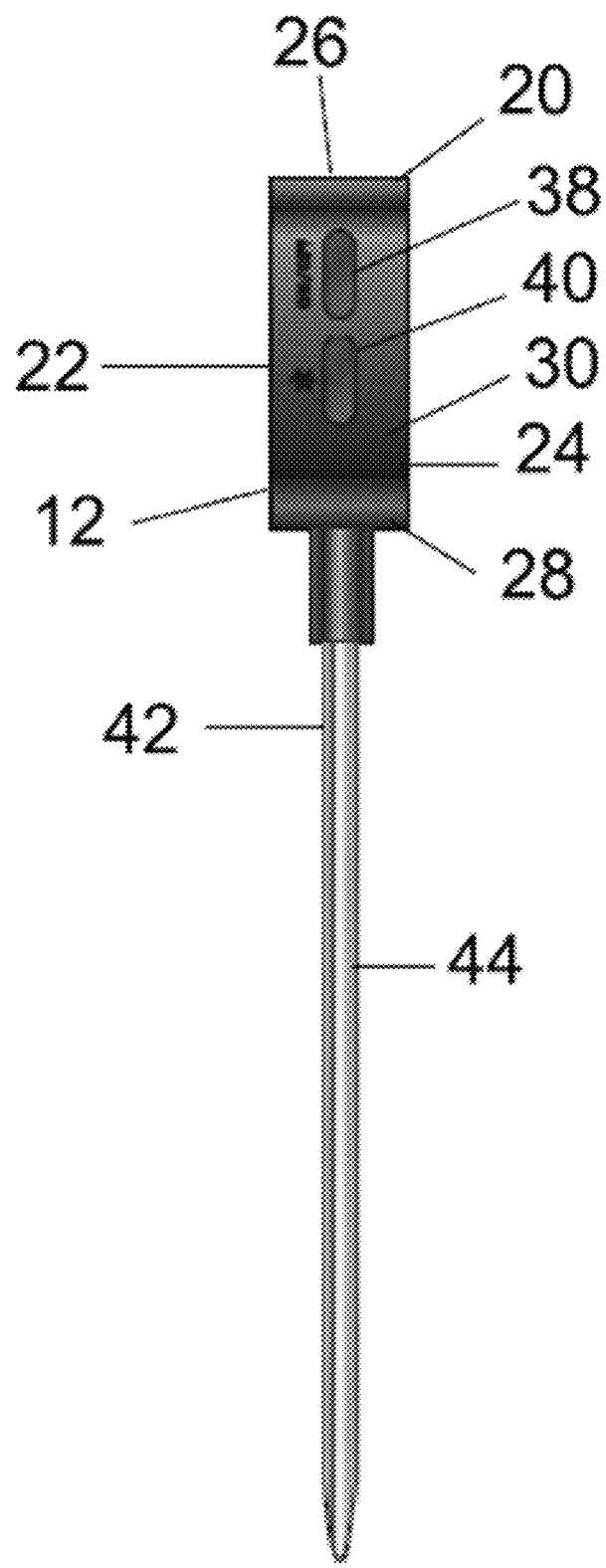
FIGS. 5A-5B are side elevational views of embodiment of a thermometer and an electronic label according to the invention. The embodiment depicted in FIG. 5A has a rectangular housing, whereas the embodiment depicted in FIG. 5B has an elliptical housing.
Figure 5B:
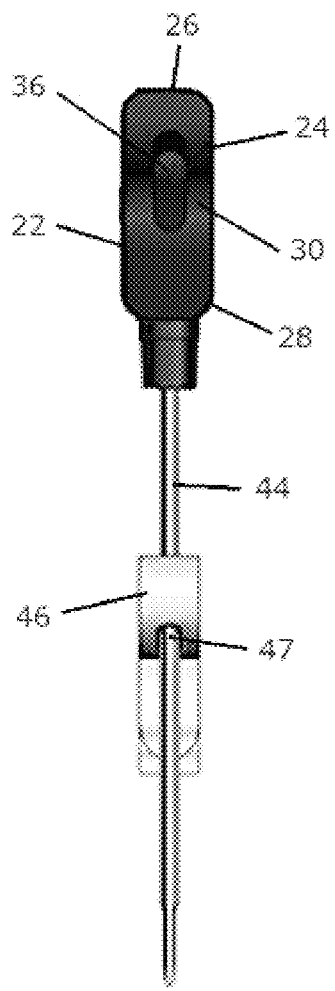
Figure 6:
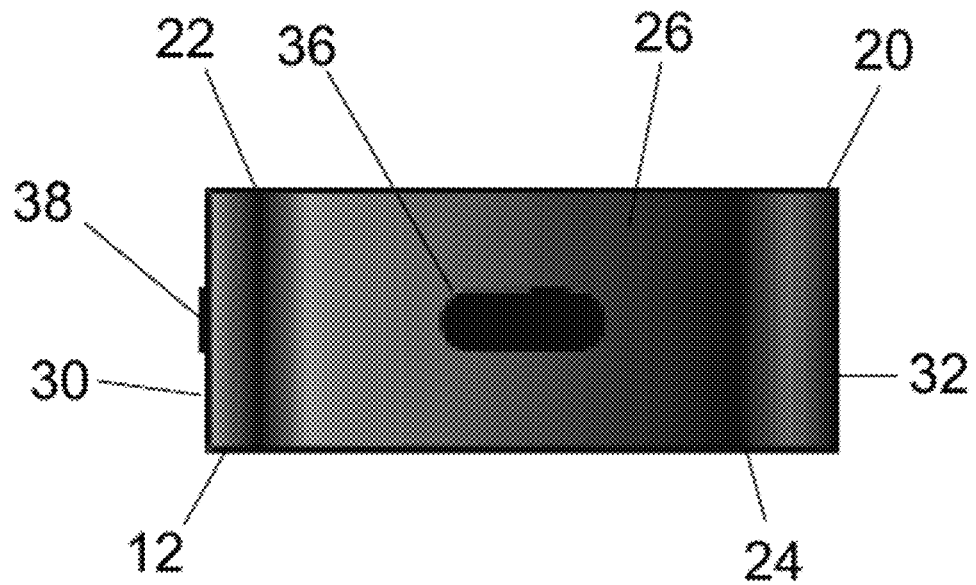
FIG. 6 is a top plan view of an embodiment of a thermometer and electronic label according to the invention.

The housing 20 may have any of a variety of shapes. In one embodiment, the housing 20 is substantially rectangular, as seen in FIGS. 1, 2A, 3A, and 5A. In another embodiment, the housing 20 is elliptical, as seen in FIGS. 2B, 3B, and 5B.

Figure 2A:
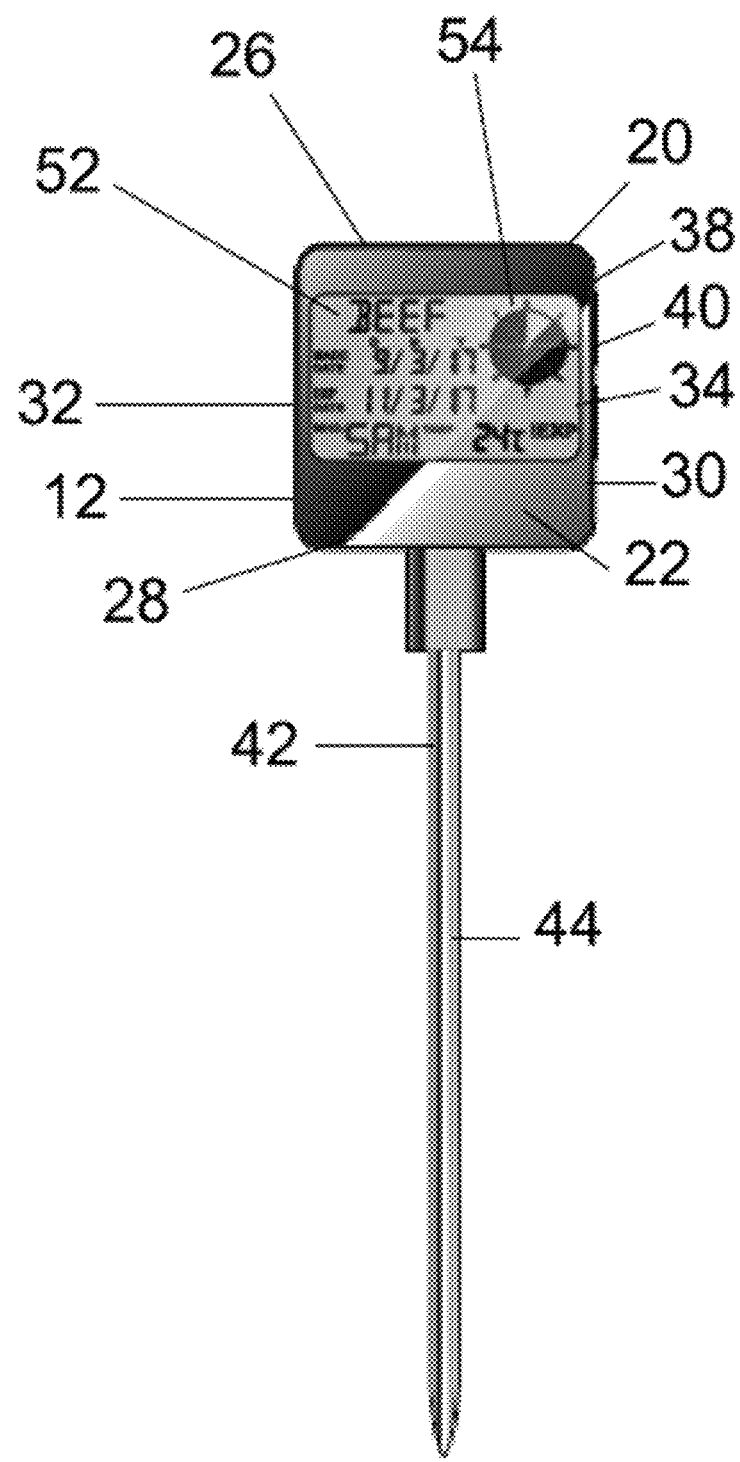
FIGS. 2A-2B are front elevational views of embodiments of a thermometer and an electronic label according to the invention. The embodiment depicted in FIG. 2A has a rectangular housing, whereas the embodiment depicted in FIG. 2B has an elliptical housing.
Figure 2B:
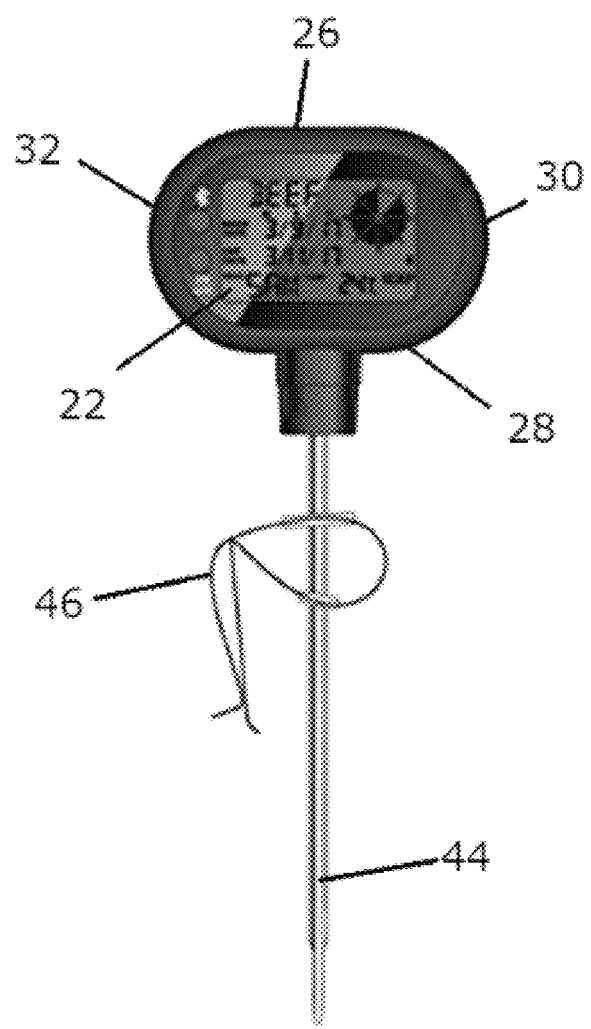
Figure 3A:
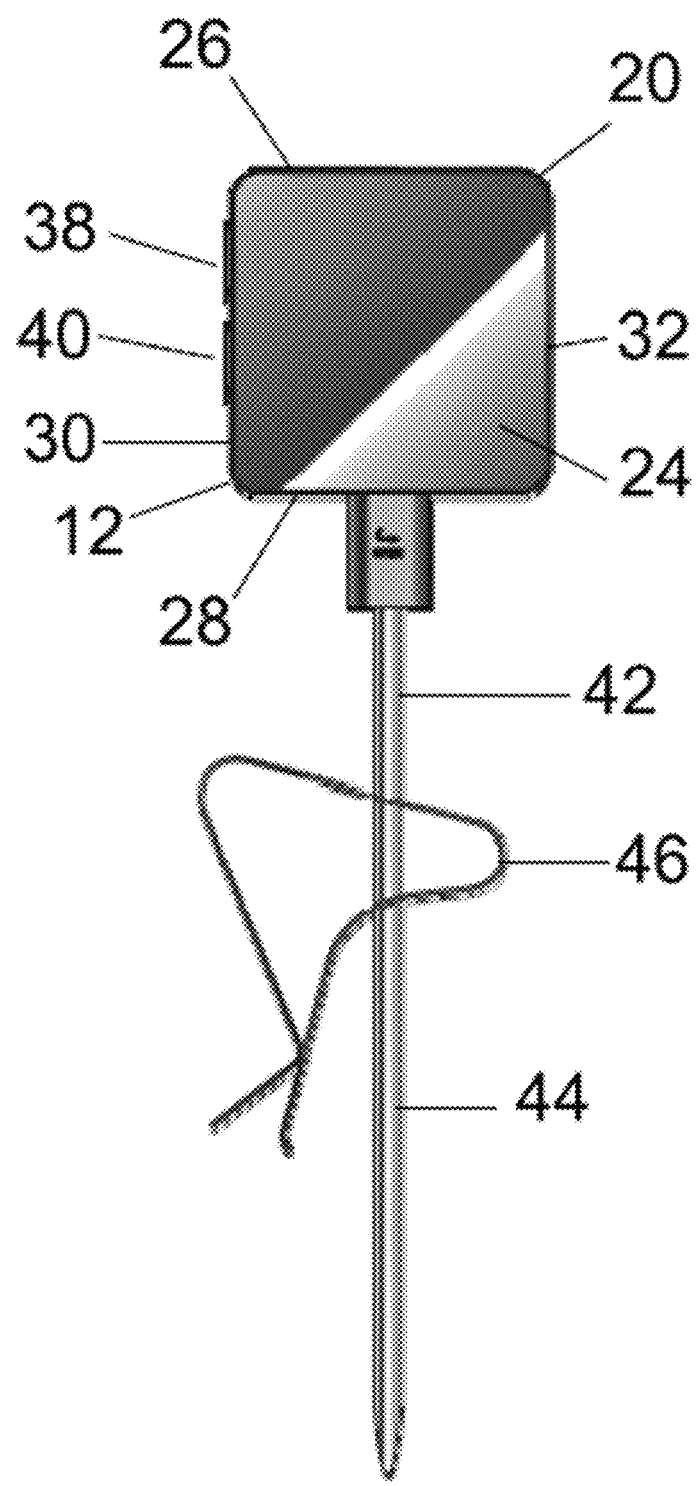
FIGS. 3A-3B are back elevational views of embodiments of a thermometer and an electronic label according to the invention. The embodiment depicted in FIG. 3A has a rectangular housing, whereas the embodiment depicted in FIG. 3B has an elliptical housing.
Figure 3B:
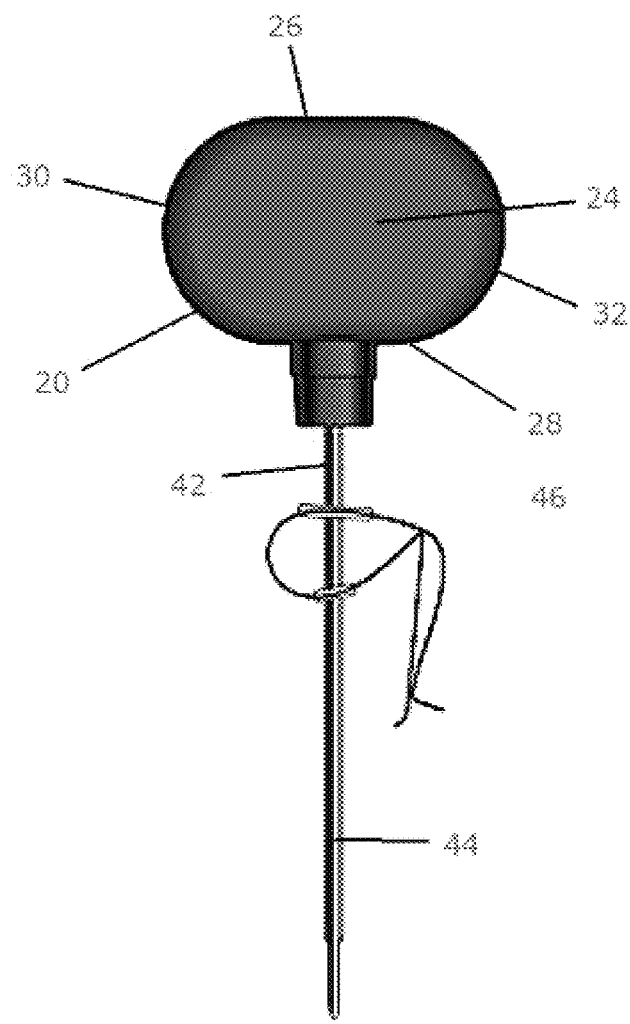
Figure 4:
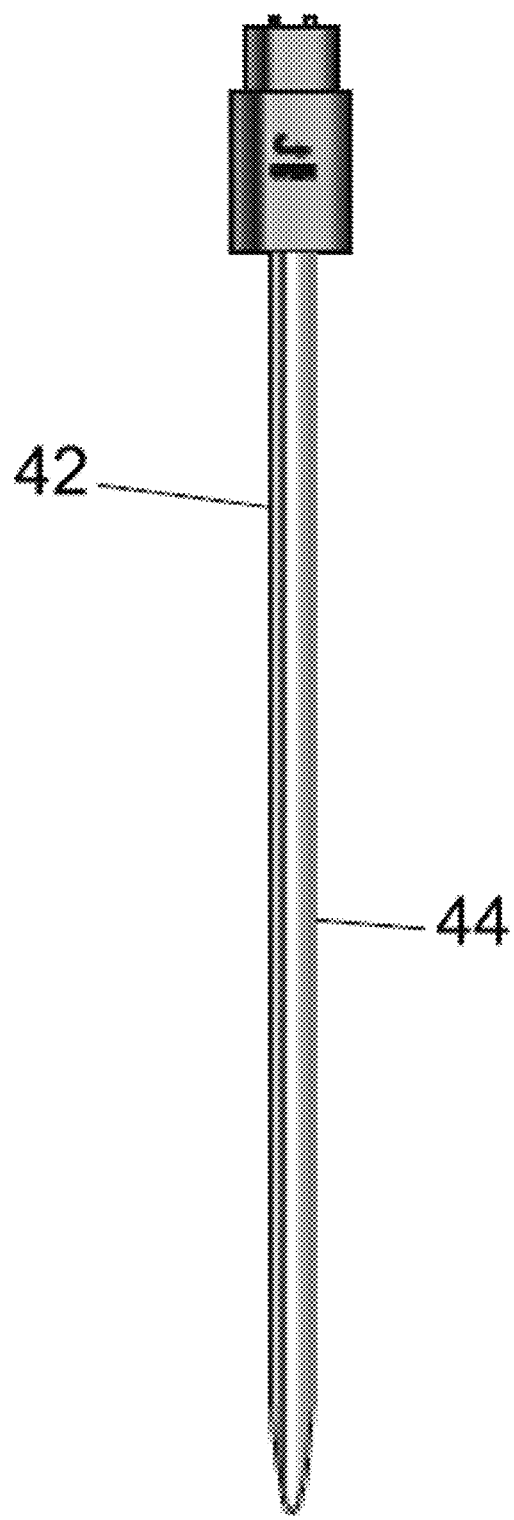
FIG. 4 is a back elevational view of an embodiment of a temperature probe of a thermometer and an electronic label according to the invention.
Figure 7A:
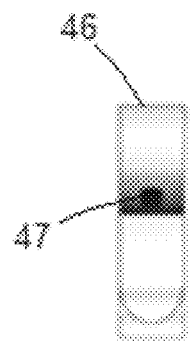
FIGS. 7A-7B are schematic views of the top (FIG. 7A) and bottom (FIG. 7B) of an embodiment of a clip according to the invention.
Figure 7B:
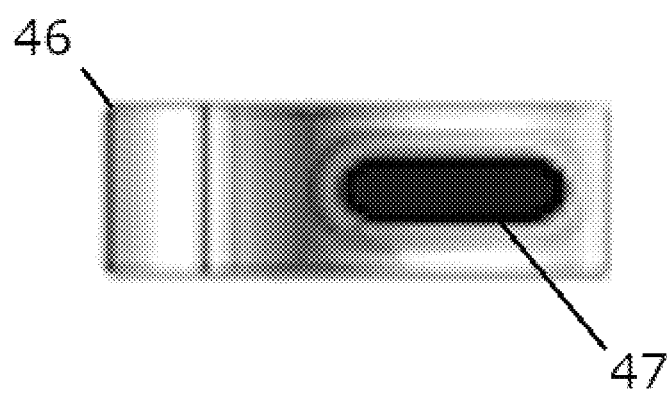
Figure 8:
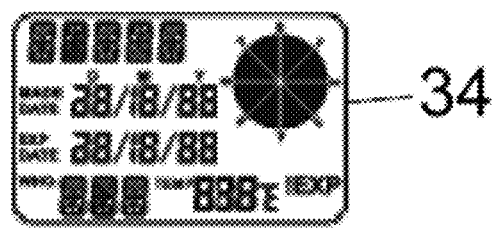
FIG. 8 is a schematic view of an embodiment of an electronic label display according to the invention.

As shown in FIGS. 1-5, the thermometer 12 may include a temperature measurement device 42. In an embodiment, the temperature measurement device 42 is an elongated probe 44 that extends from the bottom 28 of the housing 20. In an embodiment, the probe 44 is made of metal such as stainless steel. In an embodiment, the probe 44 is detachable from the housing 20 for cleaning. The thermometer 12 may include a clip 46 to allow the probe 44 to be attached to a product container. In an embodiment, the clip 46 is made of metal such as stainless steel. The clip 46 may take the form of a thin wire, such as depicted in FIGS. 1, 2B, and 3, or may alternatively be formed from a wider piece of metal, as depicted in FIGS. 5B, 7A-7B. Optionally, grommets, such as translucent rubber grommets, may be inserted between the probe 44 and holes 47 in the clip 46 to ensure a good fit. FIGS. 7A-7B show a clip 46 formed from a piece of metal from the side and bottom, respectively, and having two holes 47 for connection to the probe 44.

In an embodiment, the temperature measurement device 42 may be a laser. In an embodiment, the temperature measurement device 42 may be an infrared (IR) device. The thermometer 12 may include a memory device to store data such as temperature data from the temperature measurement device 42. The thermometer 12 may be used to measure the temperature of an expiration-dated product. In an embodiment, the expiration-dated product is a food product.

Figure 9:
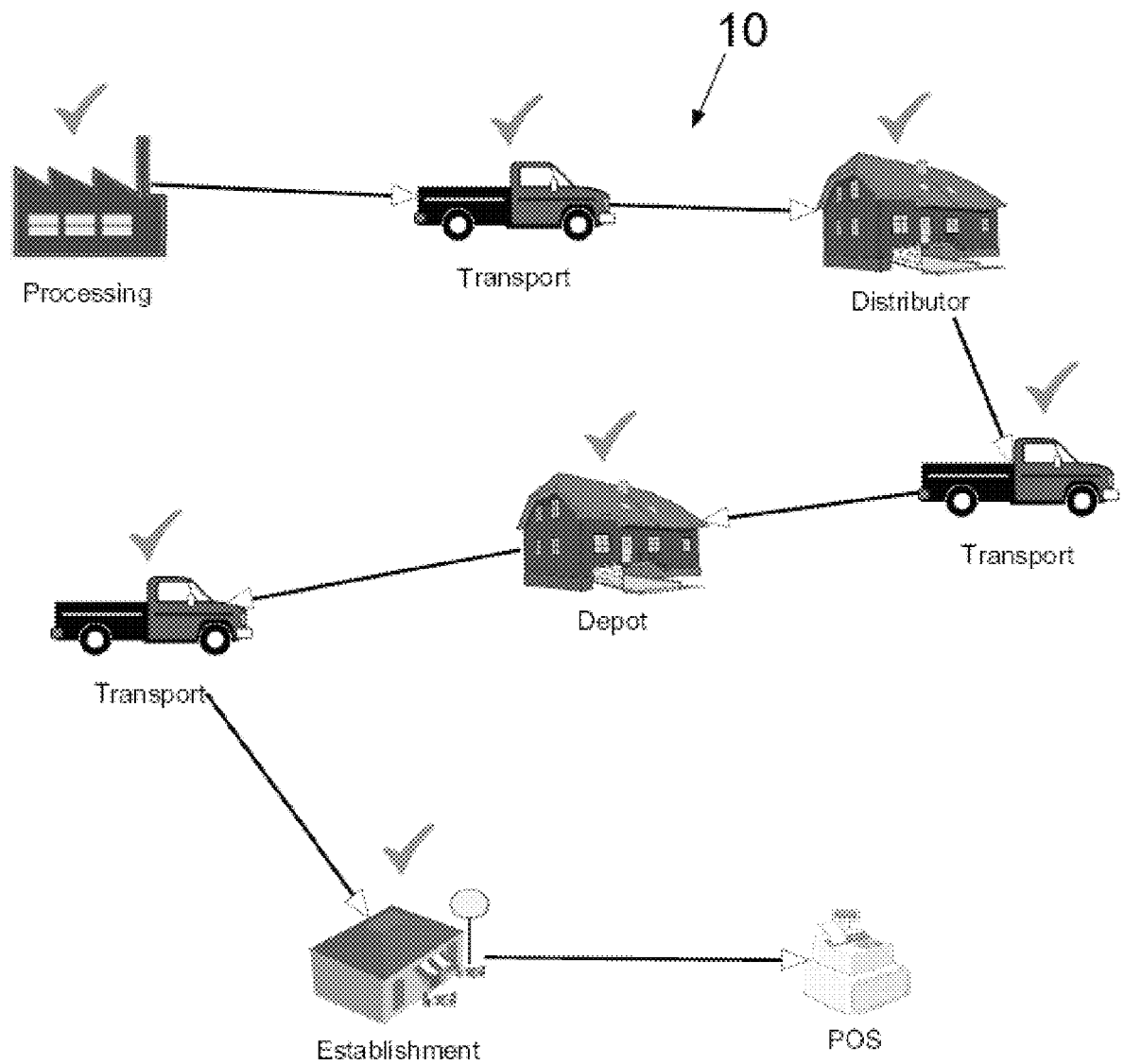
FIG. 9 is a schematic view of an embodiment of the temperature monitoring and labeling system according to the invention.

Referring to FIG. 1, the smart device 14 may be an electronic device that can be connected to other devices or networks by one or more wireless protocols. Examples of such devices include, but are not limited to, smartphones, tablets, phablets, and smartwatches. In an embodiment, the smart device 14 has a Bluetooth brand device for communication with the Bluetooth brand device of the thermometer 12. The smart device 14 may include a device for communication with the cloud 16. In an embodiment, the smart device 14 has Wi-Fi brand device for communication with the cloud 16. In an embodiment, the smart device 14 has a cellular network device for communication with the cloud 16. The smart device 14 may be in communication with the communications center 18 through the cloud 16. The smart device 14 may include an operating system. In an embodiment, the operating system is an Android brand operating system. In an embodiment, the operating system is an iOS brand operating system. The smart device 14 may include a program product including a machine-readable program code, such as an application, for causing, when executed the smart device 14 to perform steps. The smart device 14 may include a user interface display 48. Referring to FIG. 9, the system 10 can be utilized at a variety of locations such as processing facilities, delivery vehicles, warehouses, restaurants, and stores in which expiration-dated products such as food products are processed, transported, stored, sold, and consumed.

Referring to FIGS. 1, 2A-2B, and 10-17, the system 10 may include a program product, such as an application, that is loaded on the smart device 14. In an embodiment, the program product is an application 50 for use with an Android brand operating system. The application 50 provides for bidirectional communication with one or more thermometers 12. In an embodiment, such communication is provided through Bluetooth brand devices, as described above. The thermometer 12 is capable of taking temperature readings at intervals specified through the application 50. The thermometer 12 can transfer such data to the application 50 when the thermometer 12 is connected to the smart device 14. Upon connection, the electronic label display 34, as shown in FIGS. 2A-2B, will be activated. The thermometer 12 is capable of storing a certain amount of data. In an embodiment, the thermometer 12 can store up to 200 individual temperatures. The thermometer 12 is capable of storing timestamp data.

As shown in FIG. 2, the electronic label display 34 may show indicia 52 about the expiration-dated product such as a food product. In an embodiment, the indicia 52 includes the name of the food product (e.g., BEEF), the exact date when such product was made (e.g., Sep. 13, 2017), the exact date when such product will or has expired (e.g., Nov. 13, 2017), the name of the person associated with such product (e.g., SAM), and the current temperature of such product (e.g., 24° C.). In an embodiment, the indicia 52 includes a timer 54 that provides a visual indication of the lifespan of the food product from creation to expiration. In an embodiment, the timer 54 starts on the current date and takes the difference between the expiration date and the current date and divides the time by 8. Each sector of the timer 54 represents 1/8 of the time lapse.

Figure 10:
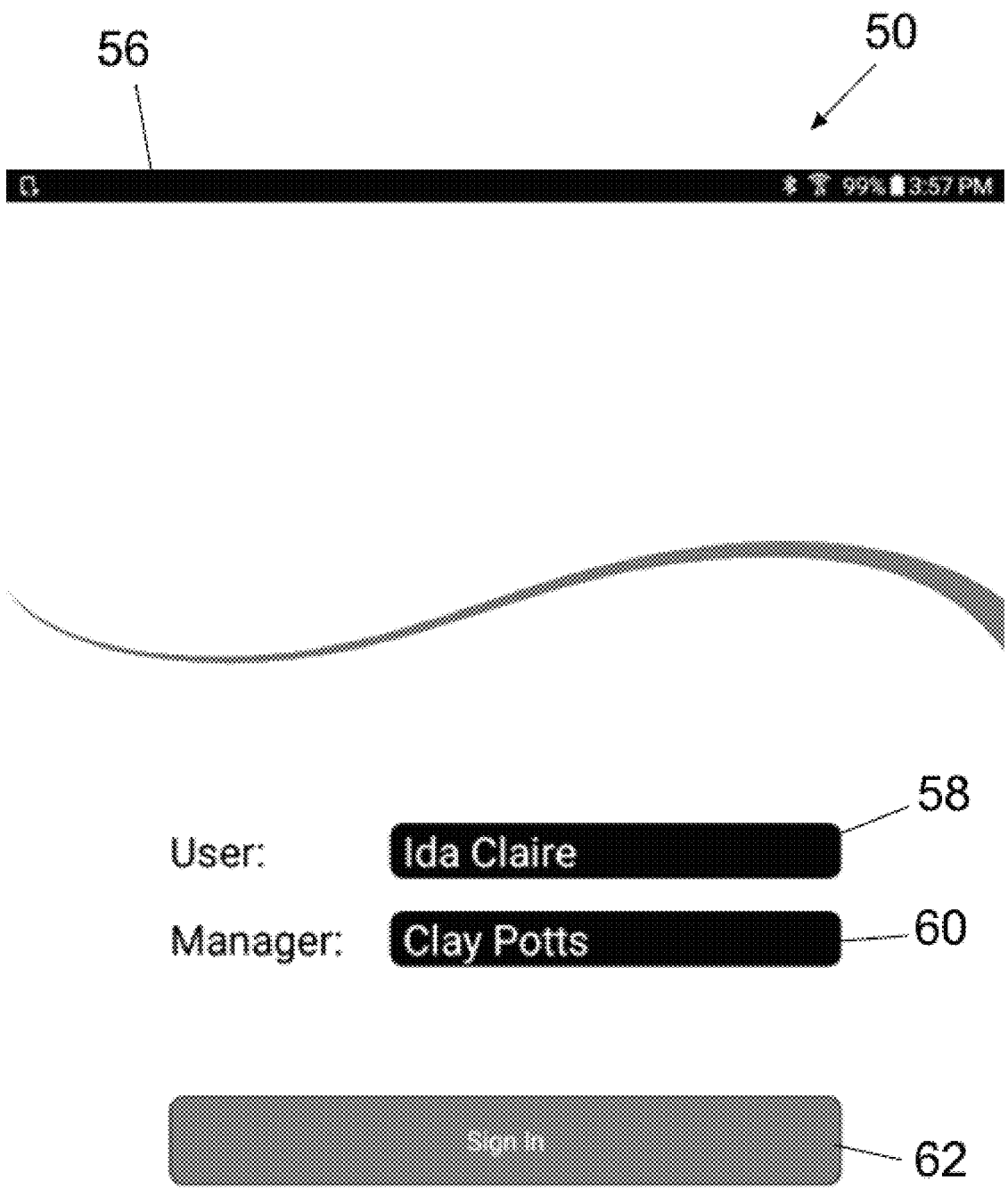
FIG. 10 is a schematic view of an embodiment of an application screen of the temperature monitoring and labeling system according to the invention.

Once the application 50 is launched, a login screen 56, as shown in FIG. 10, may be displayed on the user interface display 48 of the smart device 14. In an embodiment, the login screen 56 includes a user field 58 and a password/manager field 60. In an embodiment, the login screen 56 includes a command/sign in button 62. The pressing or clicking of the button 62 allows the user to enter the application 50.

Figure 11:
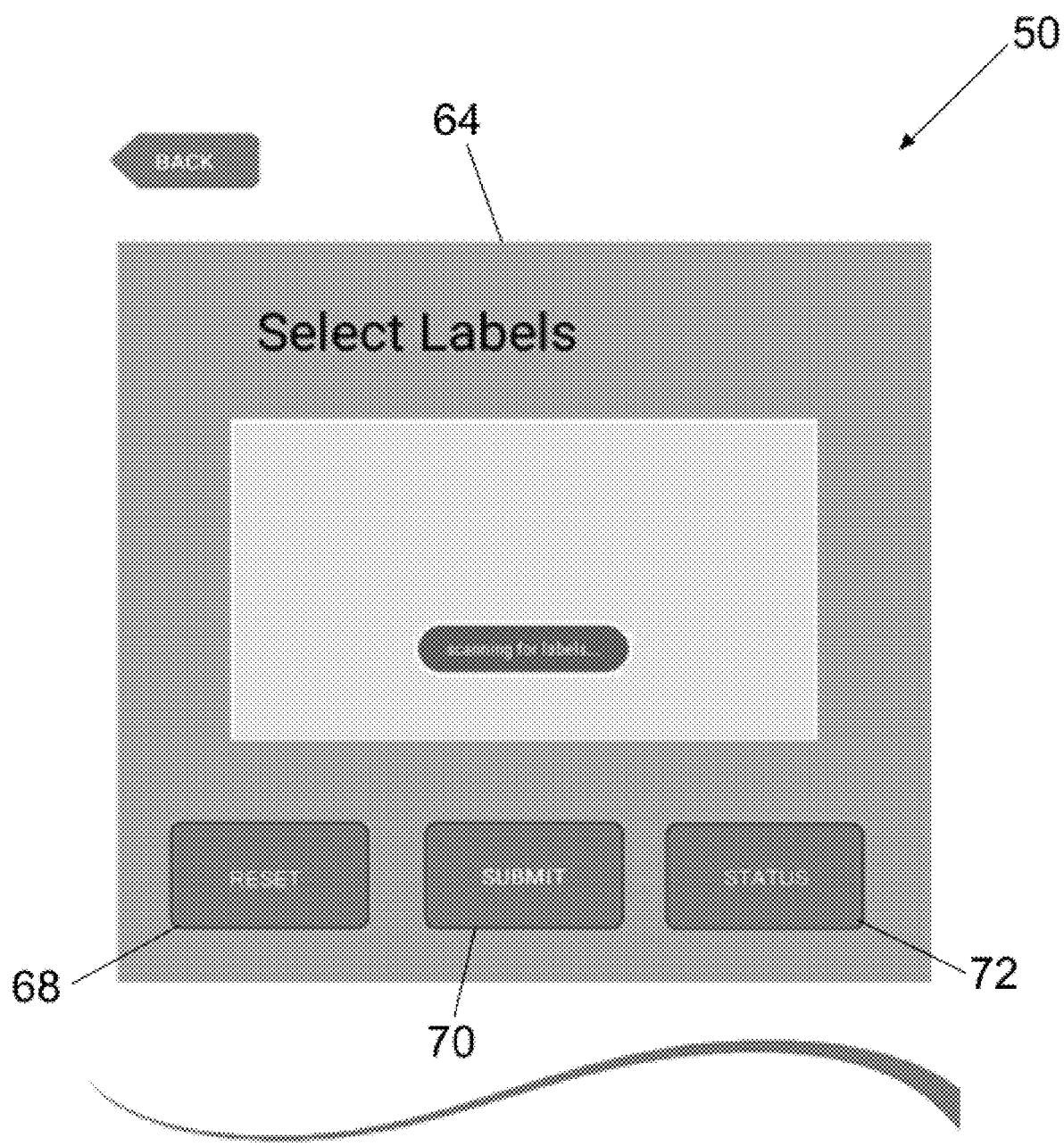
FIG. 11 is a schematic view of an embodiment of an application screen of the temperature monitoring and labeling system according to the invention.
Figure 12:
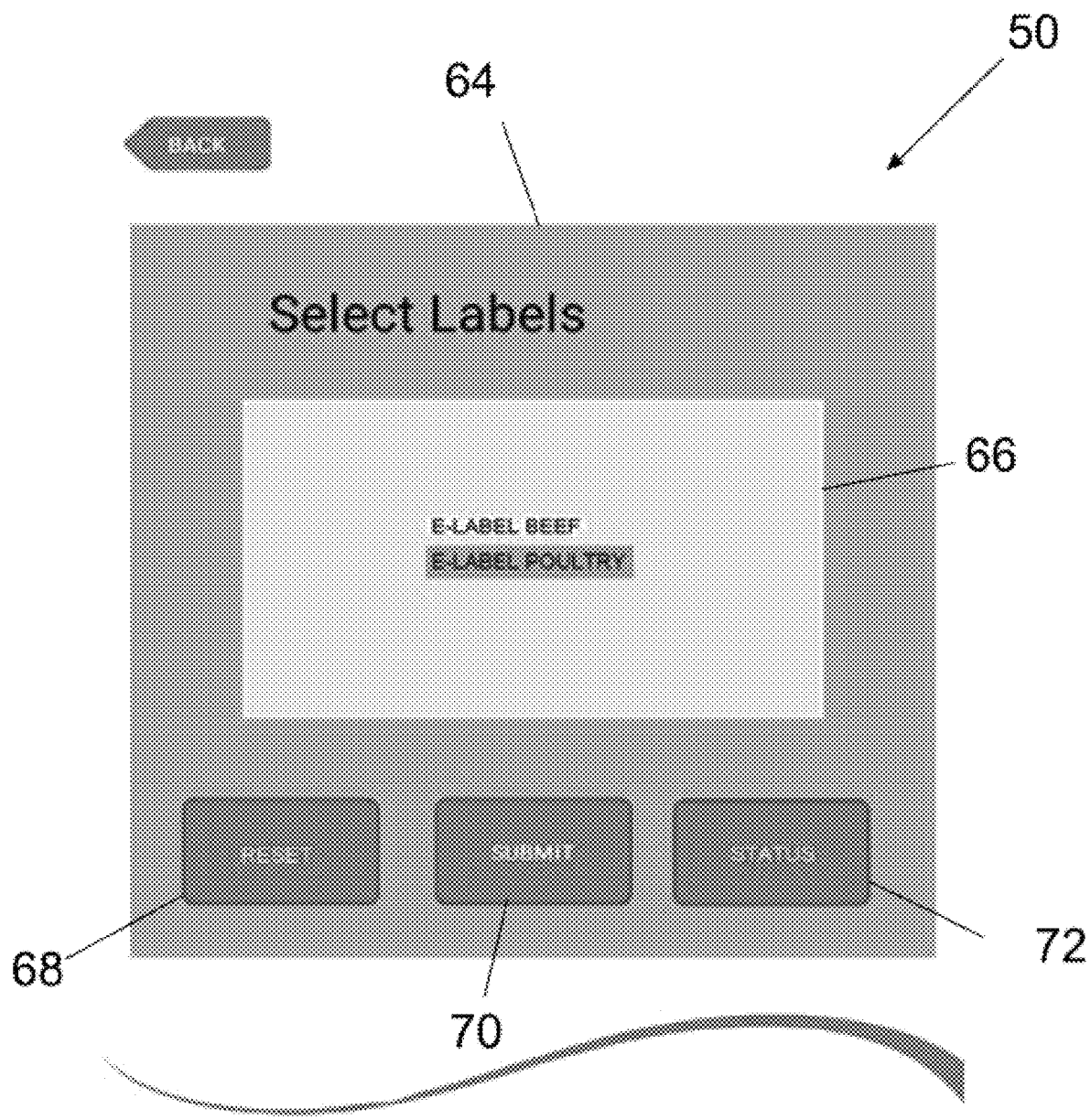
FIG. 12 is a schematic view of an embodiment of an application screen of the temperature monitoring and labeling system according to the invention.

Referring to FIGS. 11 and 12, an embodiment of the application 50 includes a select labels screen 64. After the button 62 has been used pressed or clicked, the application 50 scans for one or more thermometers 12 as shown in FIG. 11 and displays a list 66 of such thermometers 12 as shown in FIG. 12 (e.g., E-LABEL BEEF, E-LABEL POULTRY). The user may select a thermometer 12 from the list 66. The selected thermometer 12 will then be connected to the smart device 14. In an embodiment, this connection causes the electronic label display 34 of the selected thermometer 12 to be a first color such as blue. In an embodiment, the screen 64 includes a reset button 68, a status button 70, and a submit button 72. The pressing or clicking of the reset button 68 clears all of the settings on the selected thermometer 12. The pressing or clicking of the status button 70 allows the application 50 to read data transmitted by the selected thermometer 12.

Figure 13:
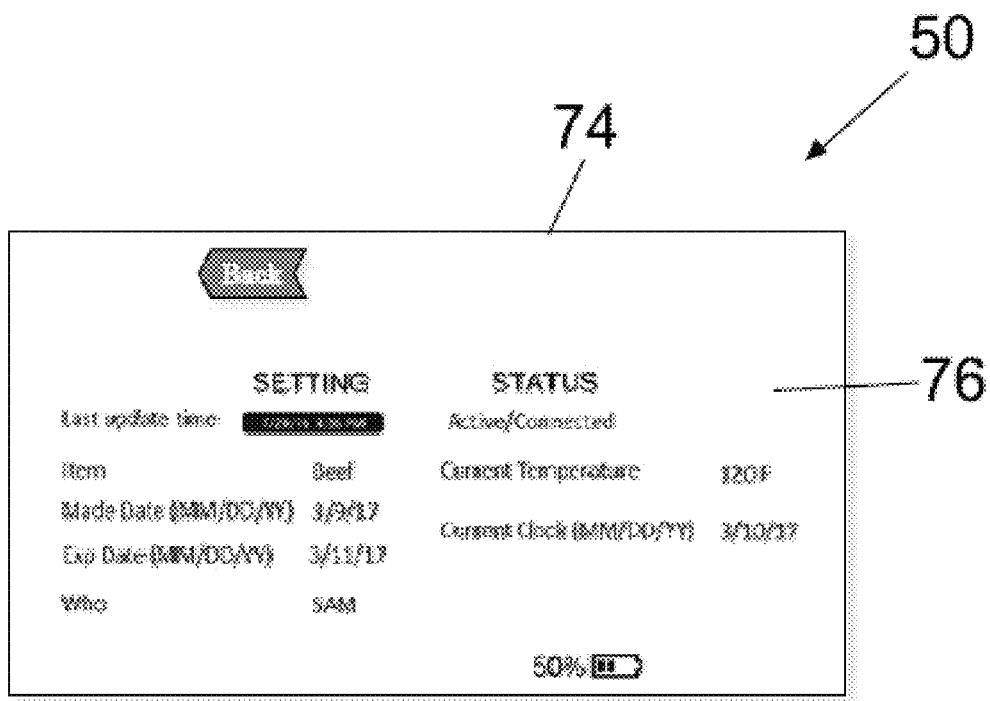
FIG. 13 is a schematic view of an embodiment of an application screen of the temperature monitoring and labeling system according to the invention.

As shown in FIG. 13, the application 50 may include a status screen 74 for showing transmitted data 76 from the selected thermometer 12 on the user interface display 48 of the smart device 14. In an embodiment, the transmitted data 76 include setting and status information such as last update time, item, date, user/manager, temperature, clock, and battery information. Once the transmitted data 76 have been downloaded, the electronic label display 34 of the selected thermometer 12 will change to a second color such as green.

Figure 14:
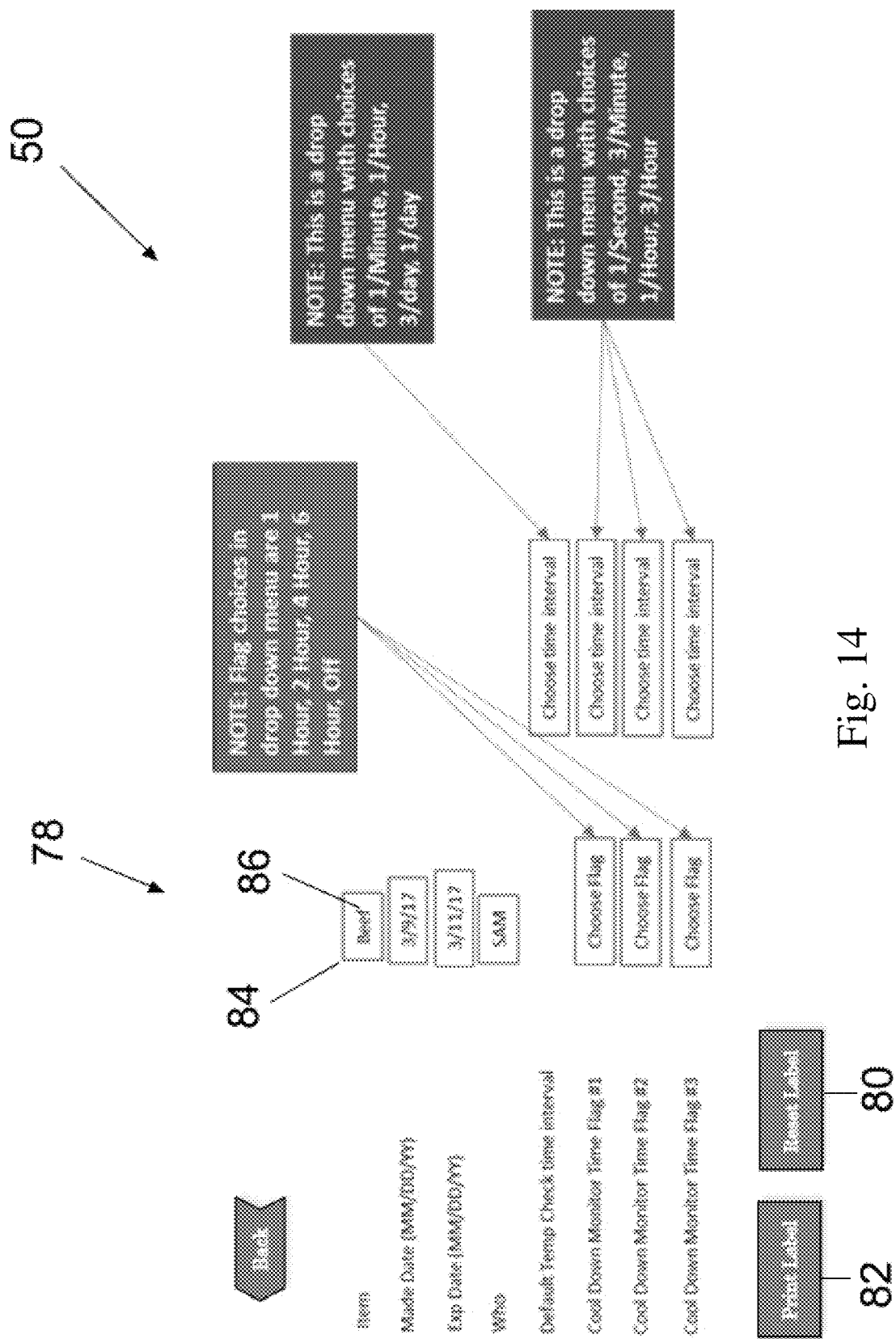
FIG. 14 is a schematic view of an embodiment of an application screen of the temperature monitoring and labeling system according to the invention.

Referring to FIGS. 11, 12, and FIG. 14, the application 50 may include a submit screen 78 that is shown on the user interface display 48 of the smart device 14 when the submit button 72 is pressed or clicked. In an embodiment, the submit screen 78 includes a reset button 80 and a print label 82. When the reset button 80 is pressed or clicked, the electronic label display 34 of the selected thermometer 12 will be reset. The pressing or clicking of print label button 82 will output or transmit data from the smart device 14 to the selected thermometer 12.

As shown in FIG. 14, the submit screen 78 may include one or more fields 84 to enter data 86 about an expiration-dated product such as a food product. In an embodiment, the fields 84 include item, made date, expiration date, who, default temperature check time interval, cool down monitor time flag, and choose time interval information. In an embodiment, there are three cool down monitor time flag fields. In an embodiment, the cool down monitor time flag fields are selected from a menu including 1 hour, 2 hour, 4 hour, 6 hour, and off. In an embodiment, the default temperature check time interval field is selected from a menu including 1/minute, 1/hour, 3/day, and 1/day. In an embodiment, the choose time interval fields of the cool down monitor time flag fields are selected from menus including 1/second, 3/minute, 1/minute, 3/hour, and 1/hour. In an embodiment, the default temperature check time interval is required. This default frequency would be used if no information is entered in the cool down monitor time flag fields. The pressing or clicking of the print label 82 will transmit the data 86 entered in the fields 84 from the smart device 14 for use and display on the selected thermometer 12.

Figure 15:
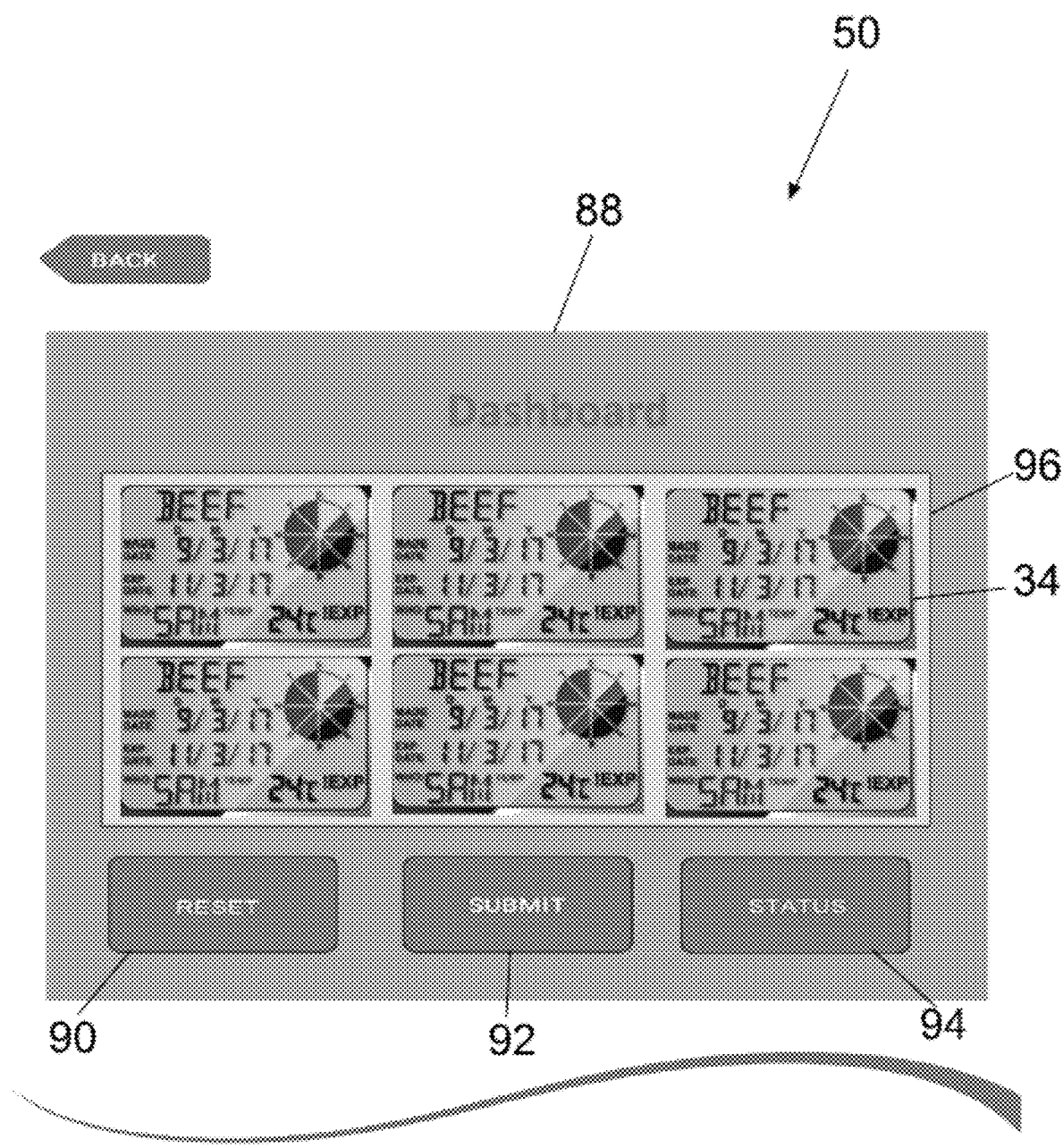
FIG. 15 is a schematic view of an embodiment of an application screen of the temperature monitoring and labeling system according to the invention.

As shown in FIG. 15, the application 50 may include a dashboard screen 88 that is shown on the user interface display 48 of the smart device 14. In an embodiment, the dashboard screen 88 includes a reset button 90, a submit button 92, and a status button 94. In an embodiment, the dashboard screen 88 shows one or more images 96 of electronic label displays 34 of the thermometers 12.

Figure 16:
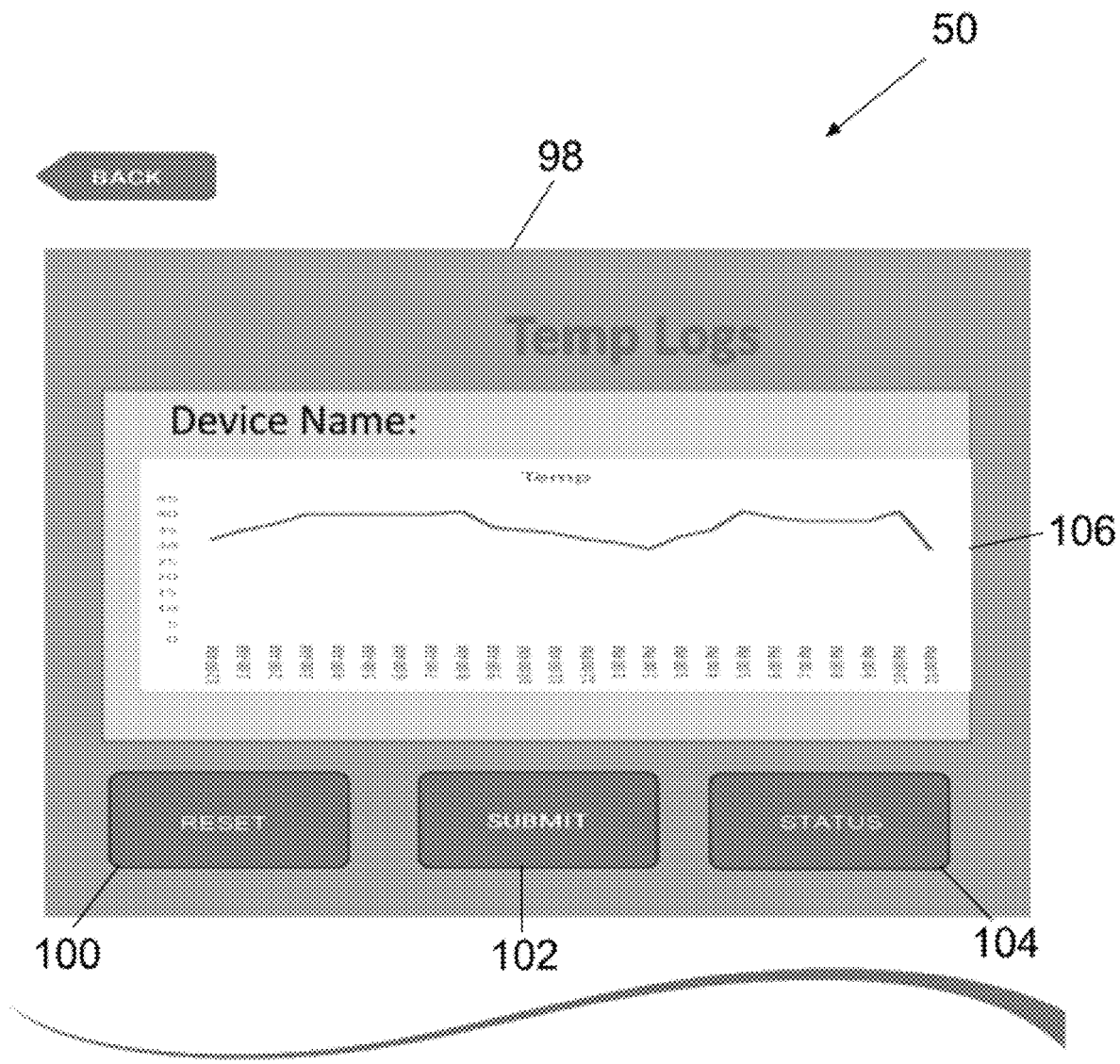
FIG. 16 is a schematic view of an embodiment of an application screen of the temperature monitoring and labeling system according to the invention.

As shown in FIG. 16, the application 50 may include a temperature logs screen 98 that is shown on the user interface display 48 of the smart device 14. In an embodiment, the temperature logs screen 98 includes a reset button 100, a submit button 102, and a status button 104. In an embodiment, the temperature logs screen 98 allows a user to select a thermometer 12 to view temperature data 106.

Figure 17:
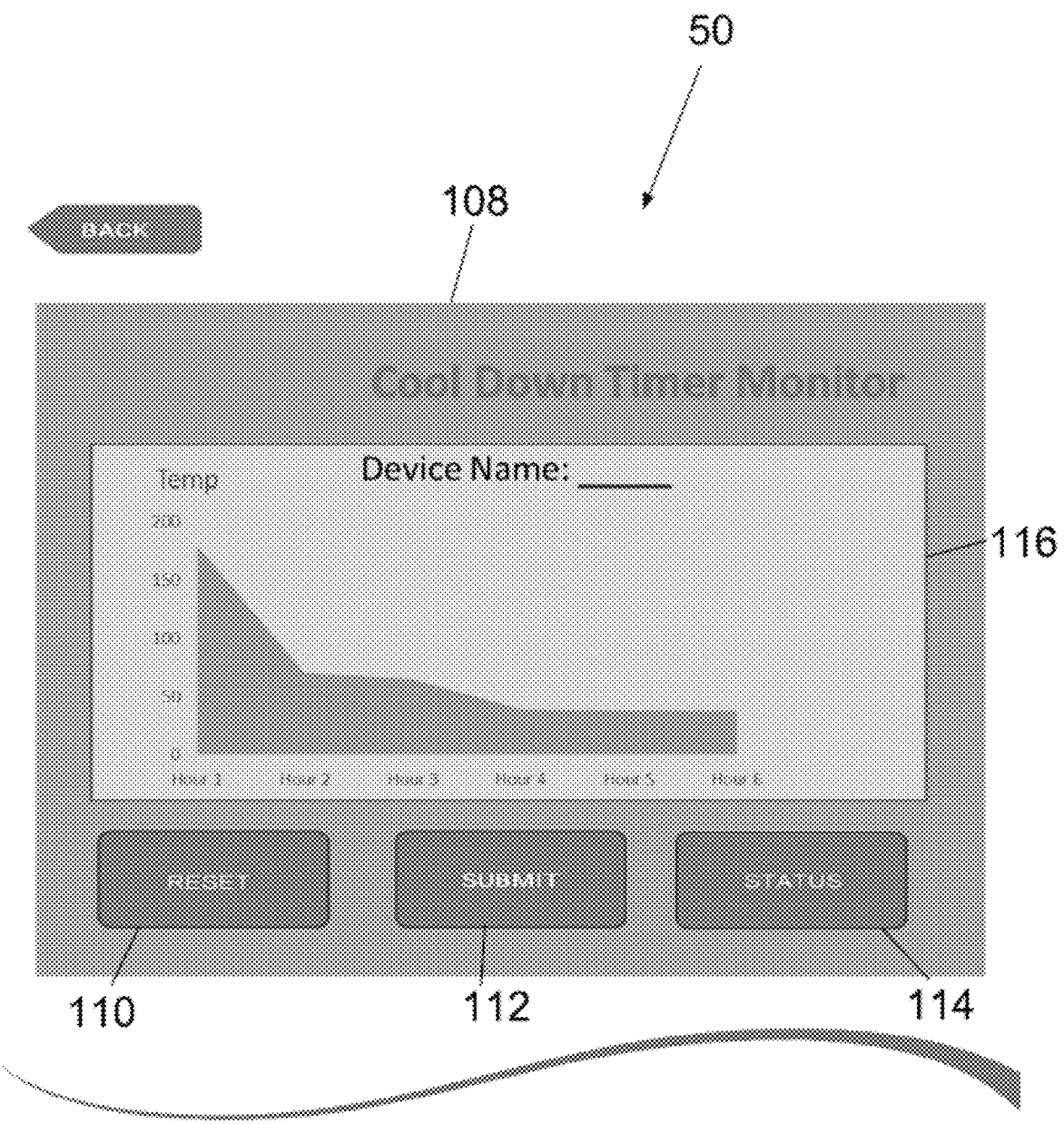
FIG. 17 is a schematic view of an embodiment of an application screen of the temperature monitoring and labeling system according to the invention.

As shown in FIG. 17, the application 50 may include a cool down timer monitor screen 108 that is shown on the user interface display 48 of the smart device 14. In an embodiment, the cool down timer monitor screen 108 includes a reset button 110, a submit button 112, and a status button 114. In an embodiment, the cool down timer monitor screen 108 allows a user to select a thermometer 12 to view cool down temperature data 116.

Referring to FIG. 1, the application 50 may allow the smart device 14 to transmit and receive data concerning one or more thermometers 12 to one or more control centers 18 through a network such as the cloud 16.

Referring now to FIGS. 18-21, the system 10 may further include a charging station 200. In general, the charging station 200 may be used to recharge one or more thermometers 12 as needed or desired. The charging station 200 is configured to allow multiple thermometers 12 to recharge at once. The charging station 200 is formed from a base 202 with feet 204 on a bottom surface 206 for enhanced grip on a surface. In one embodiment, depicted in FIG. 19A, the charging station 200 includes five ports 208 for thermometers 12 on a top surface 210 of the charging station 200. A side 212 of the base 202, depicted in FIG. 21A, includes a USB port 214 for connection to a power source. The USB port 214 is electrically connected to the ports 208. A suitable USB power cord can connect the USB port 214 to a power source, and thereby provide power to the ports 208 for charging thermometers 12. LED lights 216 may be disposed on the top surface 210 to convey to the user whether power is being delivered to a specific charging port 208. The charging station 200 may include any desired number of ports 208.

Figure 18A:
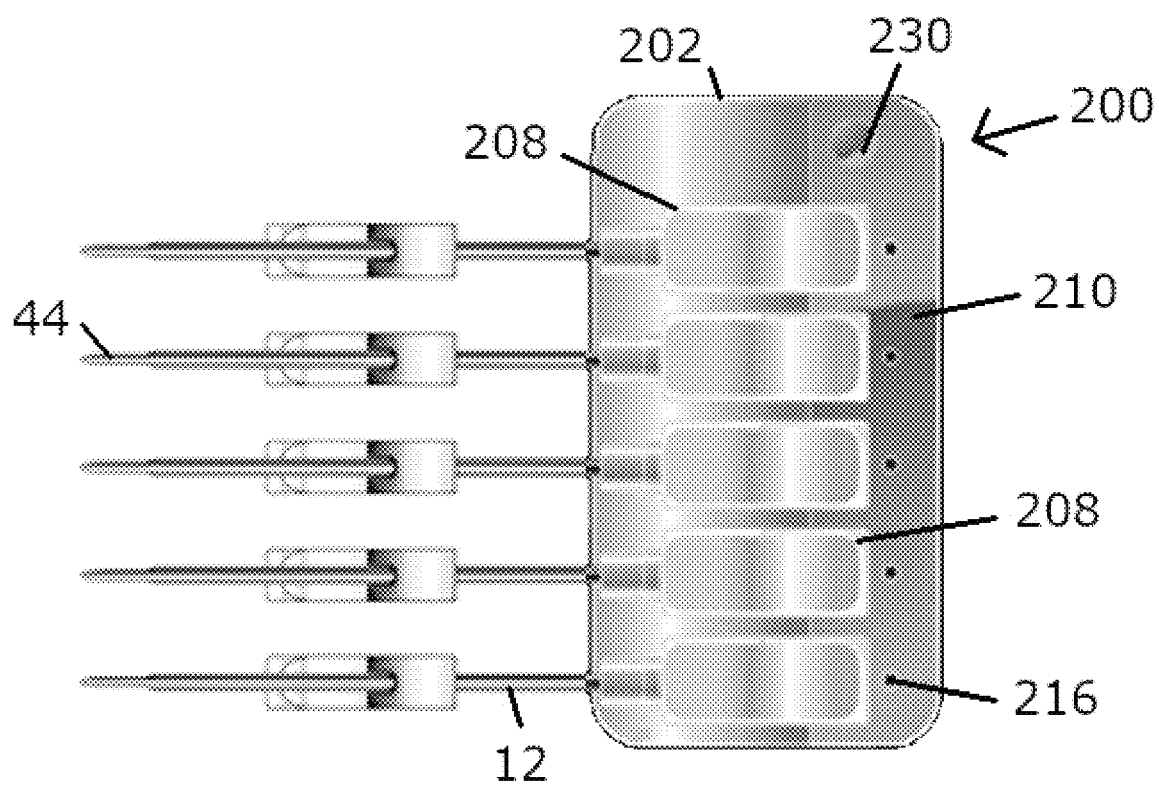
FIG. 18A is a schematic view of an embodiment of a charging station with thermometers being recharged.
Figure 18B:
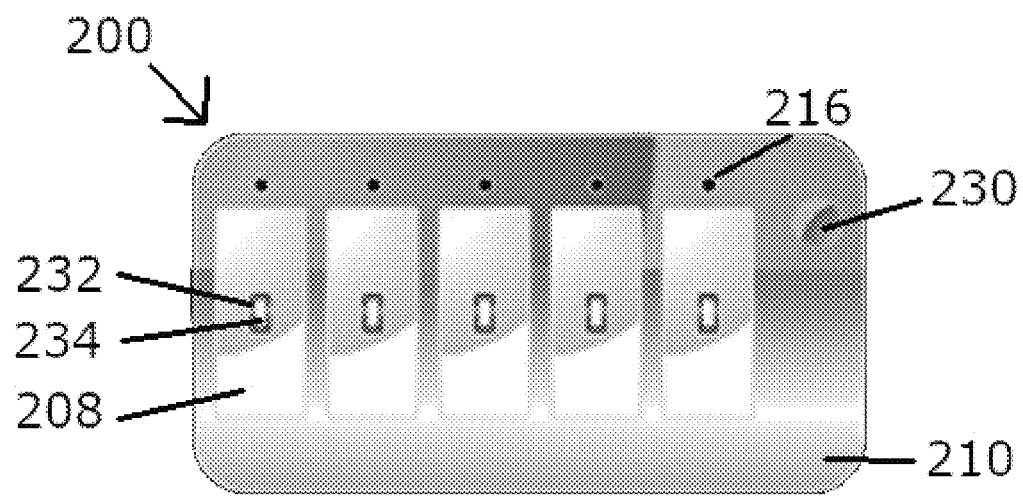
FIG. 18B is a schematic view of an embodiment of a charging station without thermometers being recharged.

FIG. 18A shows the top surface 210 of a charging station 200 with five thermometers 12 being charged in the ports 208. LED lights 216 are illuminated on the top surface 210 of the charging station 200, indicating that power is being delivered to the charging ports 208. Port 36 on thermometer 12 may electrically connect with connector 234 of the charging station 200, seen in FIG. 18B, so as to recharge a rechargeable battery within the housing 20 of the thermometer 12 when power is supplied to the charging station 200. A release button 230 is disposed on the top surface 210 and configured to release the thermometers 12 from the charging ports 208 by actuation of a mechanism within the base 202 which moves a release member 232 upward in the direction of the thermometer 12 so as to force the release of the thermometer off of the connector 234. FIG. 18B shows the top surface 210 of the charging station 200 without thermometers 12 in the charging ports 208.

Figure 19A:
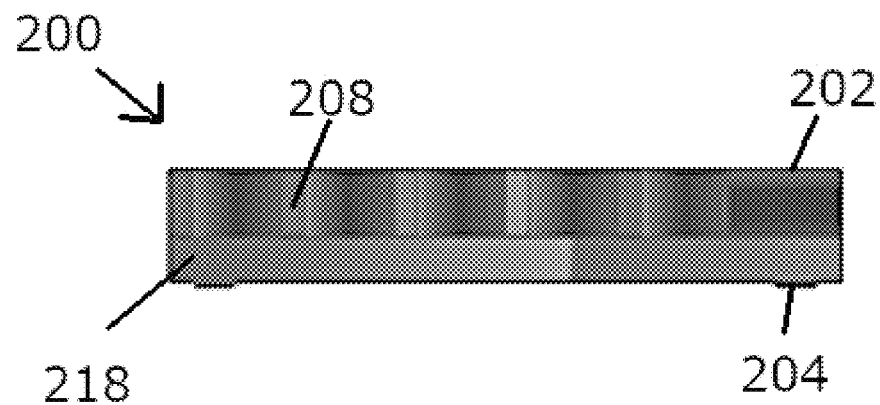
FIGS. 19A-19C are schematic views of an embodiment of a charging station.
Figure 19B:
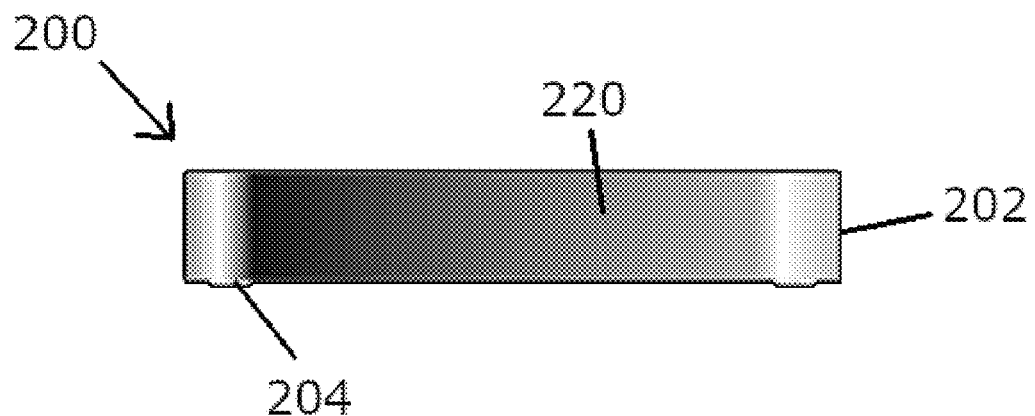
Figure 19C:
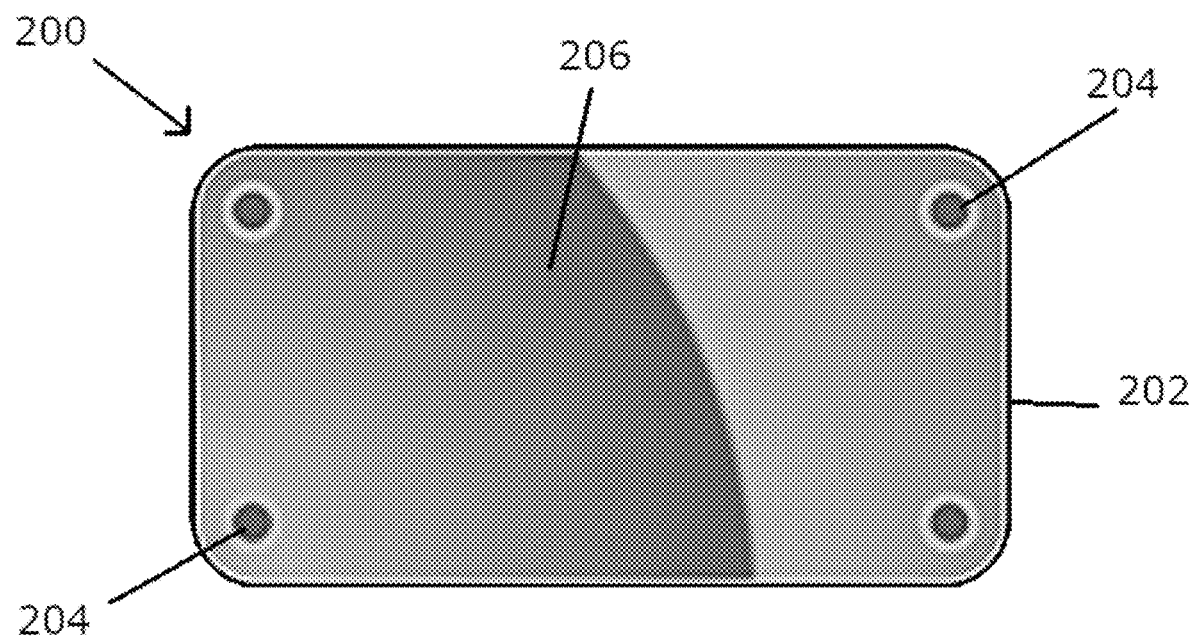

FIG. 19A shows the front side 218 of the base 202 of the charging station 200. Ports 208 define cavities on the front side 218 shaped and sized for thermometers 12. FIG. 19B shows the back side 220 of the base 202 of the charging station 200. FIG. 19C shows the bottom surface 206 of the base 202 of the charging station 200. As seen in FIGS. 19A-19C, the base 202 of the charging station 200 includes feet 204 for enhanced gripping on surfaces.

Figure 20:
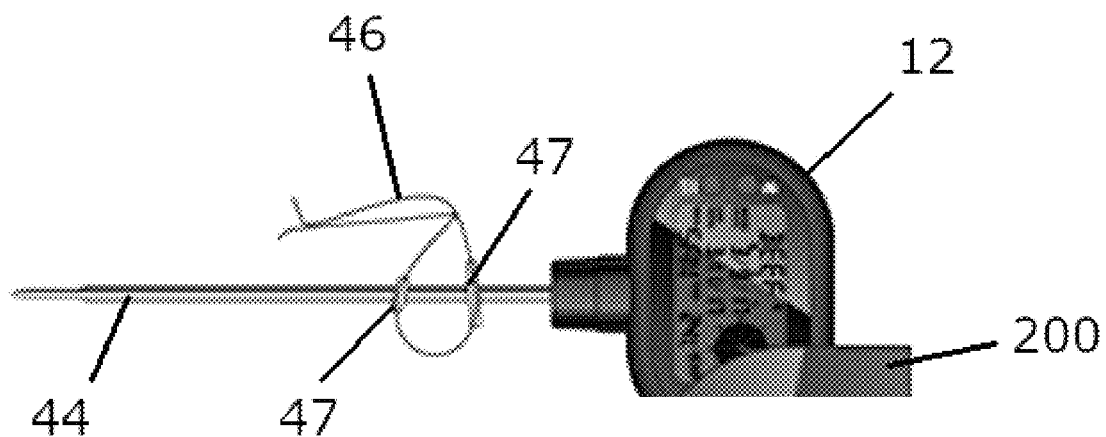
FIG. 20 is a schematic view of a thermometer in a charging port of a charging station.

FIG. 20 is a partial side view of the charging station 200 with a thermometer 12 in a charging port 208. The clip 46 may be used for easy removal of the thermometer 12 from the charging port 208.

Figure 21A:
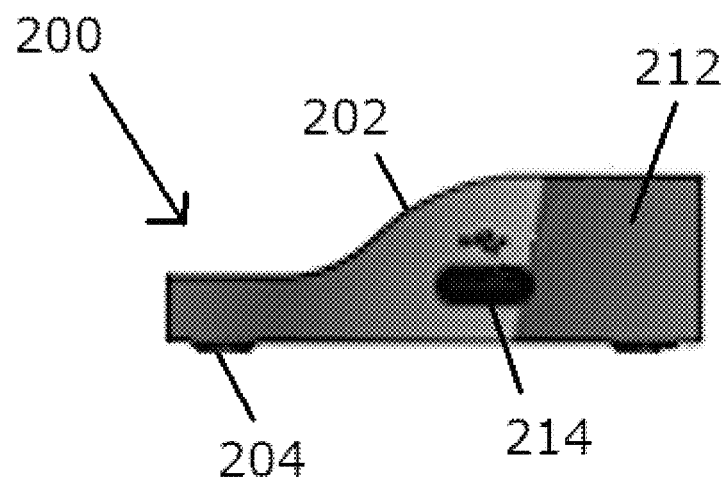
FIG. 21A is a schematic view of a first side of an embodiment of a charging station.
Figure 21B:
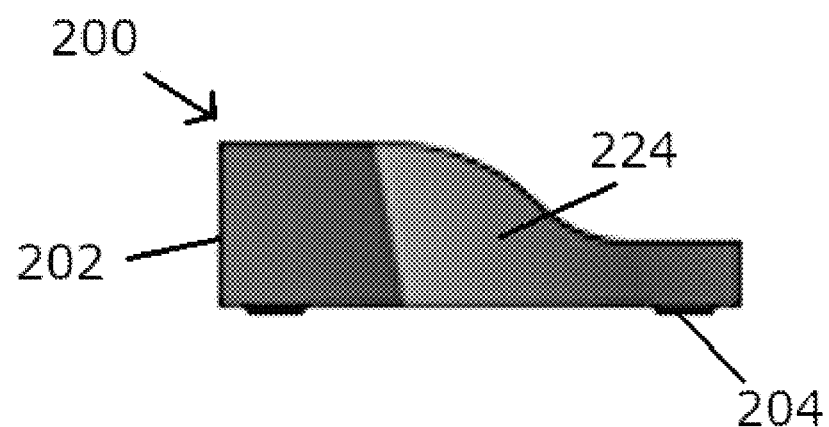
FIG. 21B is a schematic view of a second side of an embodiment of a charging station.

FIG. 21A is a side view of a first side 222 of the charging station 200, without thermometers 12 in the charging ports 208. The USB port 214 which is electrically connected to ports 208 is visible. FIG. 21B is a side view showing a second side 224 of the charging station 200, which in this example embodiment does not include a USB port. However, the charging station 200 may include a plurality of USB ports 214 if so desired.

The invention provides the features and the advantages described above, and also provides many other features and advantages. For example, the invention accomplishes the following: integrates a thermometer into a smart food rotation label display; provides a cloud-based application; continuously logs temperatures and time of various food products; archives data for business management and regulatory purposes; provides parameters around which alerts, notifications, warnings, and other information can be created; allows alerts, notifications, warnings, and other information to be sent by electronic means such as texts, email, and other means; allows data to be sent to multiple stakeholders such as corporate, district, local, and other personnel; allows a thermometer to receive and send data; allows the ability to observe, record, and alert the cool-down process time period such as a standard 1, 2, 4, or 6 hour period; allows for the tracking and the recordation of temperature during the complete lifecycle of food; allows for the connection of a thermometer to a storage container to enable temperature monitoring throughout the food's lifecycle within the food service environment; provides for live temperature monitoring; provides digital food identification; provides for bidirectional communication between thermometers, smart devices, and control centers through the cloud; provides a thermometer with an electronic label display that shows information about the food product including expiration information; provides an identification of the location of the food; provides historic temperature curve, over different time intervals, across the lifecycle of food; provides a system that can be combined with audits (e.g., HAACP) and checklists; provides a system that can be used to submit reports for health inspection reporting and procedures (e.g., SOP); allows personnel at remote locations to determine that a food establishment such as a restaurant is following procedures and guidelines; provides a system that can be used in conjunction with a wearable smart device, point-of-sale (POS) system, weigh scale, nutritional analysis, lifecycle analysis of food; provides for cradle to grave/creation to expiration monitoring of food; provides a system in which food can be monitored and traced during preparation, transportation, storage, and use in a supply chain; monitors nutritional values of food during preparation and storage; allows users to electronically display and transmit data such as time, temperature, date, days remaining, and other information of individual food products both manually and automatically; provides a system that continues to monitor and log food conditions and time without risk of inadvertently using unsafe food as a result of a power outage and/or discarding food that is safe to consume; provides a system including a cloud-based application to simultaneously measure, monitor, and log temperature and age of individual food products with bidirectional communication of such information between a thermometer, a smart device, and a control center; and provides a system that can monitor information from one or more food establishments around the world.

The computer-based data processing system and method described above is for purposes of example only, and may be implemented in any type of computer system or programming or processing environment, or in a computer program, alone or in conjunction with hardware. The invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the invention have application to a wide range of industries. To the extent this specification discloses a system, the method implemented by that system, as well as software stored on a computer-readable medium and executed as a computer program to perform the method on a general purpose or special purpose computer, are within the scope of the invention. Further, to the extent this specification discloses a method, a system of apparatuses configured to implement the method are within the scope of the invention.

While the invention has been described with reference to particular embodiments, it should be understood that various changes may be made and equivalents may be substituted for elements thereof without departing from the essential scope of the invention. In addition, many modifications may be made to adapt a particular situation or material to the teachings of the invention without departing from the essential scope thereof. Therefore, it is intended that the invention not be limited to the particular embodiments, but that the invention shall include all embodiments falling within the scope of the claims.

We claim:

1. A temperature monitoring and labeling system comprising:
   a smart device;
   a thermometer having a label display in wireless communication with the smart device, wherein the thermometer comprises an elongated probe; and
   a program product comprising machine-readable program code on the smart device for causing, when executed, the smart device to transmit a data set containing information to the thermometer for display on the label display, and the thermometer to transmit a data set containing temperature information to the smart device;
   wherein the smart device is in bidirectional communication with a cloud network, and the smart device is in communication with a communications center through the cloud network.

2. The temperature monitoring and label system of claim 1, wherein the thermometer comprises a USB port.

3. The temperature monitoring and label system of claim 1, wherein the thermometer comprises a clip.

4. The temperature monitoring and label system of claim 1, wherein the smart device is in bidirectional communication with the thermometer.

5. The temperature monitoring and label system of claim 4, wherein the smart device is in bidirectional communication with the communications center via the cloud network.

6. The temperature monitoring and label system of claim 1, further comprising a charging station configured to recharge the thermometer.

7. The temperature monitoring and label system of claim 1, wherein the elongated probe is detachable.

8. The temperature monitoring and labeling system of claim 1, wherein
   the machine-readable program code causes, when executed, the smart device to transmit a data set containing expiration date information to the thermometer for display on the electronic label display, and the thermometer to transmit a data set containing temperature information to the smart device.

9. The temperature monitoring and label system of claim 8, wherein the thermometer comprises a USB port.

10. The temperature monitoring and label system of claim 8, wherein the thermometer comprises a clip.

11. The temperature monitoring and label system of claim 8, wherein the smart device is in bidirectional communication with the thermometer.

12. The temperature monitoring and label system of claim 11, wherein the smart device is in bidirectional communication with the communications center via the cloud network.

13. The temperature monitoring and label system of claim 8, further comprising a charging station configured to recharge the thermometer.

14. A method of monitoring temperature of a food article, the method comprising:
   measuring a temperature of a food article with a measurement device of a thermometer, wherein the thermometer is in communication with a smart device, the smart device transmits data concerning expiration date information to the thermometer, and the thermometer transmits the measured temperature to the smart device; and
   displaying information concerning the expiration date of the food article on an electronic label display;
   wherein the measurement device is an elongated probe;
   wherein the smart device is in bidirectional communication with a cloud network, and the smart device is in communication with a communications center through the cloud network.

15. The method of claim 14, further comprising transmitting the measured temperature or information concerning the expiration date of the food article to the smart device via wireless communication, or to the communications center via the cloud network.

16. The method of claim 15, further comprising recharging the thermometer with a charging station.

17. The method of claim 14, wherein the thermometer communicates a location of the food article to the smart device.

18. The method of claim 14, wherein the thermometer observes, records, and transmits data relating to a cool-down process.

* * * * *